Titcomb & Culver,
Drain Tile.
No. 102,623.  Patented May 3, 1870.
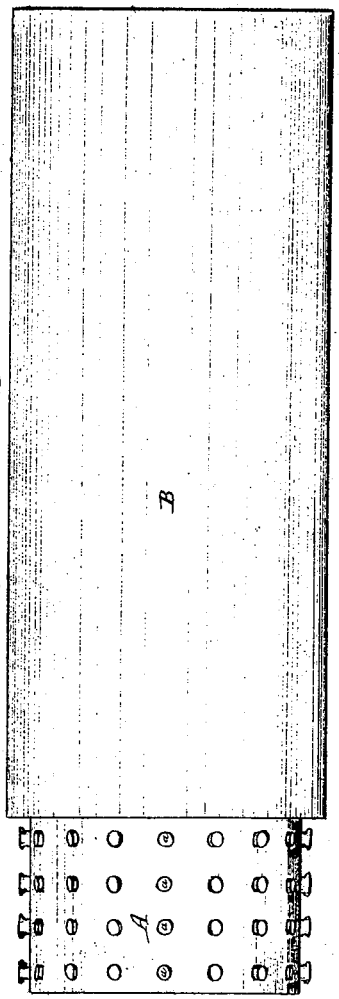
Figure 1. Longitudinal Elevation.
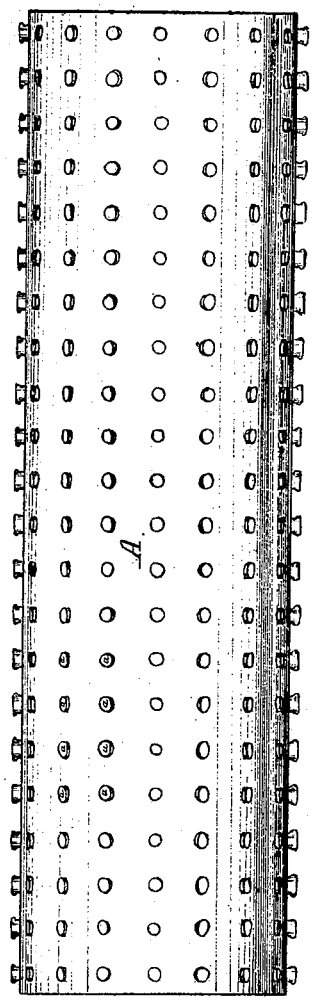
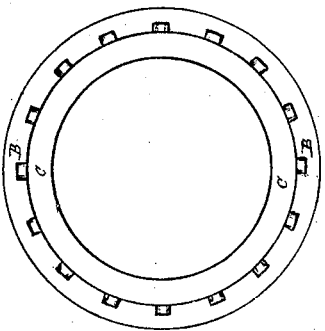
Figure 2. End Elevation.
Witnesses: Nicholas W. Vreeland, Fred. A. Nienstaedt.
George H. Titcomb,
Jno. P. Culver, Inventors.

United States Patent Office.

GEORGE H. TITCOMB AND JOHN P. CULVER, OF JERSEY CITY, NEW JERSEY.

Letters Patent No. 102,623, dated May 3, 1870.

IMPROVED DRAIN AND WATER-PIPE.

The Schedule referred to in these Letters Patent and making part of the same.

To all whom it may concern:

Be it known that we, GEORGE H. TITCOMB and JOHN P. CULVER, of Jersey City, in the county of Hudson and State of New Jersey, have invented certain Improvements in Hydraulic-Cement Drain or Water-Pipe, of which the following is a specification.

The nature and object of our invention consists in producing a more durable hydraulic-cement drain or water-pipe. To accomplish this, we use perforated iron, as hereinafter described.

We are aware that iron has been previously used in combination with hydraulic cement, and we consequently disclaim any arrangement heretofore used in the manufacture of the same; but we are not aware that perforated iron has ever been used for this purpose. We take iron of any desired thickness, and perforate it from either side, thereby leaving a rough surface, and, at the same time, a better surface for the hydraulic cement to adhere to, leaving those skilled in the art of manufacture to adopt either principle in its construction which may be deemed proper, as there will be no material difference how the hydraulic cement is applied, as it will have the same results whether lined from inside with hydraulic cement first, or outside, or whether the two are applied at once, as the hydraulic cement will combine through the perforations in such a manner as will sustain each coating of the hydraulic cement, and thereby make a strong, durable drain or water-pipe.

Figure 1 is an end elevation.
Figure 2 is a longitudinal elevation.
The same letters refer to similar parts.

A represents the iron case or pipe, $a\ a\ a$ being the perforations, and

B, the outside coat of hydraulic cement.

C represents the inside coating of the same.

Having now described our invention, we wish it to be understood that we do not claim cylindrical perforated pipe provided with metallic bosses, and lined within and covered without by cement, as exhibited in the patent granted Henry Knight, April 7, 1863; but

What we do claim as new, and wish to secure by Letters Patent, is—

The improved composite water-pipe herein shown, consisting of the metallic pipe A, perforated, as described, and lined within and covered without by the coatings of cement B and C, in the manner and for the purpose herein shown and set forth.

GEORGE H. TITCOMB.
JNO. P. CULVER.

Witnesses:
NICHOLAS G. VREELAND,
FRED. A. NIENSTADT.